United States Patent [19]
Goebel

[11] 3,801,793
[45] Apr. 2, 1974

[54] COMBINED GAS-STEAM POWER PLANT
[75] Inventor: Konrad Goebel, Erlangen, Germany
[73] Assignee: Kraftwerk Union Aktiengesellschaft, Mulheim (Ruhr), Germany
[22] Filed: July 6, 1972
[21] Appl. No.: 269,438

[30] Foreign Application Priority Data
July 9, 1971   Germany............................ 2134192

[52] U.S. Cl.......................... 290/2, 290/52, 60/39, 60/18 B
[51] Int. Cl............................................ F02b 43/08
[58] Field of Search........ 290/2, 40, 52; 60/39.18 B, 60/39.18 C, 39.18

[56] References Cited
UNITED STATES PATENTS
3,704,587  12/1972  Kreib et al. ................... 60/39.18 B
2,949,731  8/1960   Hambling....................... 60/39.18 R
3,127,744  4/1964   Nettel ............................ 60/39.18 R
3,446,014  5/1969   Foster-Pegg ....................... 60/39.18
3,704,586  12/1972  Bruns............................. 60/39.18 B
3,204,407  9/1965   Meissenberg et al. ............. 60/39.18
2,911,789  11/1959  Baker............................... 60/39.18
3,151,250  9/1964   Carlson............................... 290/52

Primary Examiner—G. R. Simmons
Attorney, Agent, or Firm—Herbert L. Lerner

[57] ABSTRACT

Combined gas-steam power plant with peak energy storage includes a steam turbine driving a generator that is coupled by a torque converter to an air compressor for a gas turbine, a shaft clutch disengagable during operation of the power plant being located between the steam turbine and the generator associated therewith.

5 Claims, 1 Drawing Figure

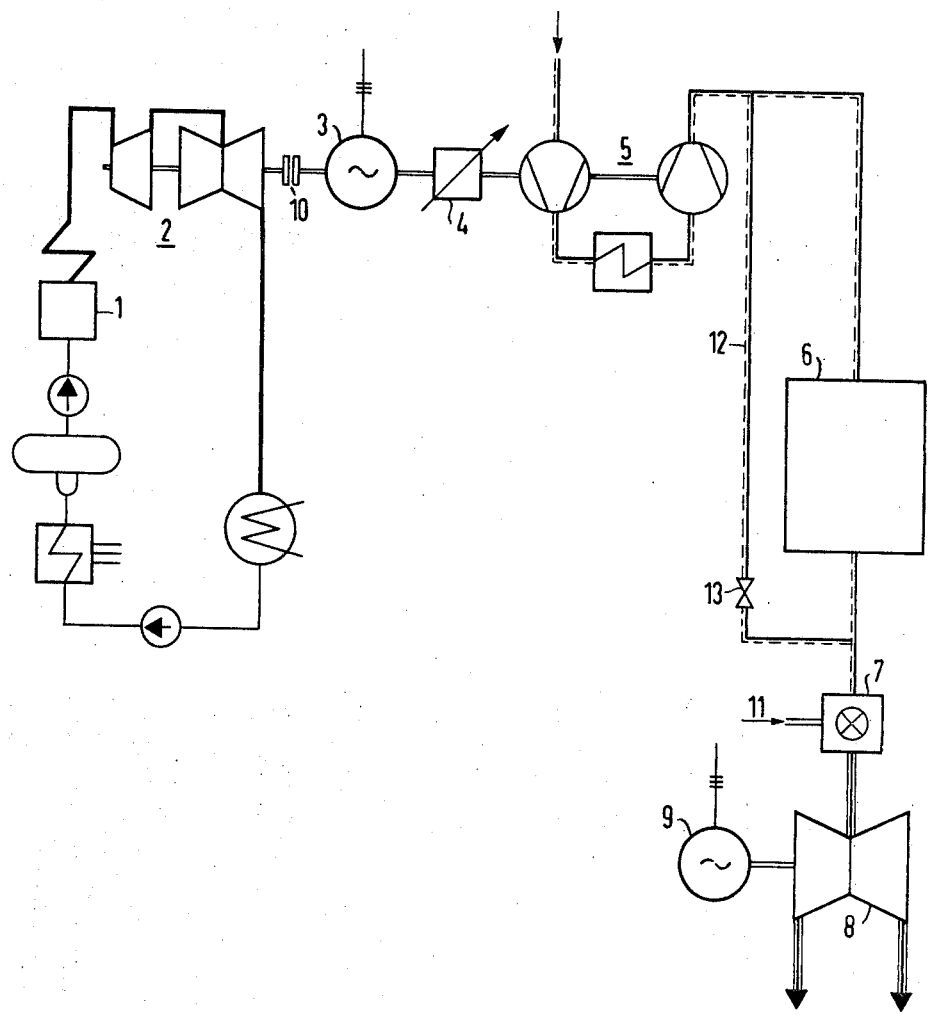

COMBINED GAS-STEAM POWER PLANT

The invention relates to a combined power plant having a steam power system and a gas power system and wherein a peak energy storage is provided.

Gas turbine installations have become known heretofore wherein combustion air, during periods of little energy demand, is compressed and conducted to a storage so that, during periods of large energy demand, the gas turbine may be able to withdraw the compressed combustion air from the storage. As is generally known, a large part of the energy produced by a gas turbine is required as compressor energy so that only a small part, such as a third thereof, for example, is available as useful energy for the generator power. If the air compression is thus temporarily separated from the energy exchange in the gas turbine and an air storage is provided, substantially three times the useful power can be produced with one and the same type of construction of the gas turbine.

The heretofore known power plants of this type, wherein underground air storages are widely employed, use excessive electrical energy from the electric mains to drive the compressors and accordingly utilize electric drive motors. In addition, consideration has already been given heretofore to using, in a combination of a gas power system with a steam power plant, the steam turbine of the steam power plant for driving the compressor. In this way, the electrical energy not required respectively in the main electrical lines for the same output of the steam turbine i.e., the amount of difference, was sought to be used as compressor power. Such a plant has the disadvantage, however, of rendering regulation more difficult for sharply varying loads in the main electric system and is suited above all only for power plants which operate according to a specific program at times with reduced but, however, constantly maintained electric load.

It is accordingly an object of the invention to provide combined gas-steam power plant which avoids the foregoing disadvantages of the heretofore known power plants of this general type.

With the foregoing and other objects in view, there is provided in accordance with the invention, a combined gas-steam power plant with peak energy storage comprising a steam turbine, a generator operatively connectible to the steam turbine, a high-pressure compressor connected to the generator, a combustion chamber for a gas turbine, air storage means connected between the compressor and the gas turbine combustion chamber, means for supplying energy in air compressed by the compressor selectively through the air storage means to the gas turbine combustion chamber and alternatively directly to the gas turbine combustion chamber, clutch means disengageable during operation of the combined power plant, and torque converter means connected between the generator and the compressor.

In accordance with other features of the invention, the clutch means is a mechanical, hydraulic-mechanical, hydraulic or electro-hydraulic clutch.

Although the invention is illustrated and described herein as embodied in combined gas-steam power plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single FIGURE of the drawing which is a schematic view of an embodiment of the combined gas-steam power plant, according to the invention, showing in greatly simplified form the parts essential thereto.

Referring now to the drawing, there is shown therein a gas-steam power plant constructed in accordance with the invention, which includes a steam power plant having a boiler 1 and a steam turbine 2. Additional conventional components of the steam power circuit or system shown at the left-hand side of the FIGURE are represented by conventional symbols therfor and are otherwise not identified since they per se do not form part of the invention of the application. A turbogenerator 3, which, in the illustrated embodiment, delivers three-phase alternating current as indicated by the symbols associated therewith, or rather, the rotor shaft of the generator 3, is connected by a disengageable clutch 10 to the turbine 2. The rotor shaft of the generator 3 is also connected at an output end thereof through a torque converter 4 to a single or multistage air compressor 5 which, in the illustrated embodiment, is a two-stage compressor.

If combustion air is delivered by the compressor 5 to an air storage tank 6 such as an underground storage vessel, for example, it is not then absolutely necessary for the gas turbine plant, which is being combined with the steam power plant, to be installed in the immediate vicinity of the latter. Compressed combustion air, which has been stored in the air storage tank 6, is conducted to a combustion chamber 7 for the gas turbine power plant, to which in addition, a suitable fuel is supplied through a line 11. The fuel is accordingly burned in the compressed air within the combustion chamber 7, and is then delivered to a gas turbine 8 which drives a gas turbine generator 9. A bypass line 12, provided with a shut-off valve 13, directly connects the outlet of the compressor 5 to the inlet to the combustion chamber 7 and permits a direct supply of the compressed combustion air to be delivered to the gas turbine combustion chamber 7 without passing through the air storage tank 6.

If the torque converter 4, which is hydraulically operated, for example is released or disengaged, and the shaft clutch 10 is engaged, the steam turbine 2 can be operated alone as in a conventional steam power plant and not in combination with the gas turbine 8. If the power demand in the electrical main lines should then drop, in order that the steam power plant should not, however, be shut down and should also not be shifted to weak partial load, the drive of the air compressor 5 can be instituted by suitably filling the hydraulic torque converter 4 so that air storage in the tank 6 can be effected. Naturally, the steam power plant can also be shut down completely, whereby the shaft clutch 10 is disengaged, and then the steam turbine generator 3 operates as a motor and electromotively drives the compressor 5.

Independently thereof, the gas turbine plant can be set in operation when the air storage tank 6 is filled. Similarly, when the torque converter 4 is released or disengaged, independent operation of the gas turbine plant alone as well as the steam turbine plant alone, is possible. Obviously, when the compressors 5 are working the gas turbine plant can also operate occasionally by by-passing the air storage tank 6. All of these different operating possibilities are attainable independently of one another both while the combined gas-steam power plant is in continuous operation or also is in a state of transition.

The combined gas-steam power plant constructed in accordance with the invention thus provides an exceptionally versatile system and one that is always ready to function in varying types of operations.

I claim:

1. Combined gas-steam power plant with peak energy storage comprising a steam turbine, a generator operatively connectible to said steam turbine, a high-pressure compressor connected to said generator, a combustion chamber for a gas turbine, air storage means connected between said compressor and said gas turbine combustion chamber, means for supplying energy in air compressed by said compressor selectively through said air storage means to said gas turbine combustion chamber and directly to said gas turbine combustion chamber, clutch means connected between said generator and said steam turbine, and torque converter means connected between said generator and said compressor, said clutch means and said torque converter means being selectively engageable and disengageable for operating the combined power plant, the steam power plant alone, the gas turbine plant alone and the compressor alone.

2. Combined gas-steam power plant according to claim 1, wherein said clutch means is a mechanical clutch.

3. Combined gas-steam power plant according to claim 1, wherein said clutch means is a hydraulic-mechanical clutch.

4. Combined gas-steam power plant according to claim 1, wherein said clutch means is a hydraulic clutch.

5. Combined gas-steam power plant according to claim 1, wherein said clutch means is an electro-hydraulic clutch.

* * * * *